United States Patent
Kang et al.

(10) Patent No.: US 11,362,691 B2
(45) Date of Patent: Jun. 14, 2022

(54) BROADCAST SIGNAL RECEIVER AND OPERATION METHOD THEREOF

(71) Applicant: LG ELECTRONICS INC., Seoul (KR)

(72) Inventors: Byeongkook Kang, Seoul (KR); Sung-Ho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 16/924,097

(22) Filed: Jul. 8, 2020

(65) Prior Publication Data

US 2021/0067185 A1    Mar. 4, 2021

(30) Foreign Application Priority Data

Aug. 27, 2019  (KR) .................. 10-2019-0104974

(51) Int. Cl.
   *H04B 1/10* (2006.01)
   *H04B 1/00* (2006.01)
   *H04B 17/391* (2015.01)
   *H04B 17/309* (2015.01)

(52) U.S. Cl.
   CPC .......... *H04B 1/1027* (2013.01); *H04B 1/0035* (2013.01); *H04B 17/309* (2015.01); *H04B 17/391* (2015.01); *H04B 2001/1072* (2013.01)

(58) Field of Classification Search
   CPC .. H04B 1/1027; H04B 17/309; H04B 17/391; H04B 1/0035
   See application file for complete search history.

(56) References Cited

U.S. PATENT DOCUMENTS

2013/0293781 A1* 11/2013 Shyshkin ............. H04N 5/4446
                                                                348/554

FOREIGN PATENT DOCUMENTS

| KR | 1020110049581 | 5/2011 |
| KR | 101652497 | 8/2016 |
| KR | 1020180084431 | 7/2018 |

OTHER PUBLICATIONS

Korean Intellectual Property Office Application No. 10-2019-0104974, Office Action dated Aug. 5, 2020, 5 pages.

* cited by examiner

*Primary Examiner* — Curtis B Odom
(74) *Attorney, Agent, or Firm* — Lee, Hong, Degerman, Kang & Waimey PC

(57) ABSTRACT

Disclosed are a broadcast signal receiver and an operation method thereof. When there are multiple broadcast signals representing the same broadcast content, the broadcast signal receiver calculates signal quality values of the respective broadcast signals, select one of the plurality of broadcast signals for a specific channel, on the basis of the signal quality values, and sets information of the selected broadcast signal as the specific channel in the channel map. Therefore, the broadcast signal receiver can prevent the number of channels from being increased due to a plurality of same channels and can provide a higher quality image to the user.

20 Claims, 6 Drawing Sheets

BROADCAST SIGNAL RECEIVER AND OPERATION METHOD THEREOF

CROSS REFERENCE TO RELATED APPLICATION

Pursuant to 35 U.S.C. § 119(a), this application claims the benefit of earlier filing date and right of priority to Korean Patent Application No. 10-2019-0104974, filed on Aug. 27, 2019, the contents of which are all hereby incorporated for reference herein in its entirety.

BACKGROUND OF THE DISCLOSURE

1. Field of the Disclosure

The present invention relates to a broadcast signal receiver and an operation method thereof. More particularly, the present invention relates to a broadcast signal receiver and an operation method thereof, which are capable of receiving a high quality broadcast signal and setting a channel therefor.

2. Description of the Related Art

The Northern American broadcast standards for digital television transmission over terrestrial, cable, and networks are changed from ATSC 1.0 to ATSC 3.0, both of which are created by the Advanced Television Systems Committee (ATSC). It is known that according to the repack schedule, broadcasters plan to transmit both ATSC 1.0 and ATSC 3.0 signals for the time being. However, cable broadcasters plan to transform ATSC 3.0 signals to ATSC 1.0 signals to remain with ATSC 1.0.

When a broadcast station transmits both an ATSC 1.0 signal and an ATSC 3.0 signal, a broadcast signal receiver needs to receive and tune both of the signals. That is, the broadcast signal receiver needs to receive the same service through two channels. In this case, since there are multiple channels providing the same service, the user may suffer inconvenience of switching among many channels to select a service of interest.

On the other hand, the demand for ultra high definition (UHD) class images having more than four times the resolution of high definition (HD) class images has increased. Accordingly, a high efficiency video coding (HEVC) scheme having more than twice the compression performance of H264 which is a conventional coding image coding scheme has been increasingly accepted as a video compression standard for next generation broadcasting. In addition, with the development of various mobile devices and streaming transmission technologies, the demand for not only UHD class images but also images conforming to various channel environments is increasing. To meet such needs, interest in services based on scalable HEVC (SHVC) technology has increased.

The main idea of scalable video coding is to encode a video as one base layer and a few enhancement layers to transmit a low quality signal and a high quality signal for the same content (same video). However, the enhancement layers are more vulnerable to noise and signal distortion than the base layer. Thus, when the reception environment for a broadcast signal is bad, the qualities of signals of the enhancement layers are deteriorated when received by a SHVC broadcast signal receiver, resulting in video and audio signals with noise.

SUMMARY OF THE INVENTION

An objective of the present invention is to provide a broadcast signal receiver capable of selecting a higher quality broadcast signal to be carried through a specific channel from among multiple broadcast signals providing the same service (e.g., same content), and a method of operating the broadcast signal receiver. Another objective of the present invention is to provide a broadcast signal receiver and a method of operating the same, both of which are capable of selecting a higher quality signal layer and processing a signal corresponding the selected layer when a received broadcast signal is a broadcast signal encoded through scalable video coding.

In order to solve the above problems, when there are multiple broadcast signals for one specific channel, the broadcast signal receiver and its operation method according to embodiments of the present invention calculate signal quality values of the respective broadcast signals, select one of the multiple broadcast signals as a broadcast signal to be carried through the specific channel, on the basis of the signal quality values, and sets a channel map in which the selected broadcast signal and the specific channel are mapped.

In order to solve the above problems, the broadcast signal receiver and its operation method according to embodiments of the present invention check a modulation scheme and a constellation of a received broadcast signal by referring to a preamble of the received broadcast signal to determine a quality reference value of the received broadcast signal, compare the determined quality reference value and a calculated signal quality value of the received broadcast signal, and selects a higher quality broadcast signal on the basis of the results of the comparison.

In order to solve the problems described above, when a user selects a specific cable channel, the broadcast signal receiver and its operation method according to embodiments of the present invention check whether there is a terrestrial broadcast channel providing the same content as the specific cable channel and switch to the terrestrial broadcast channel in a case where the terrestrial broadcast channel carries a broadcast signal that complies with a specific broadcast standard and which provides a value added service.

In order to solve the above problems described above, when a received broadcast signal is a signal encoded through scalable video coding to have multiple layers, the broadcast signal receiver and its operation method according to embodiments of the present invention calculate signal quality values of the respective layers, select a higher quality layer from among the multiple layers on the basis of the signal quality values, and process the signal of the selected layer.

As described above, when there are multiple broadcast signals corresponding to a specific channel, the broadcast signal receiver and its operation method according to embodiments of the present invention select only one broadcast signal for the specific channel from among the multiple broadcast signals on the basis of signal quality values of the respective broadcast signals, thereby preventing the user from suffering inconvenience of switching among many channels that provide the same service (same content) with different signal qualities when selecting a channel providing a service of interest.

When a user selects a specific cable channel to watch a specific content (i.e., service of interest) and there is a terrestrial broadcast channel providing a value added service for the same content, the broadcast signal receiver and its operation method according to embodiments of the present invention switch to the terrestrial channel so that the user can be provided with a higher quality broadcast signal.

When a received broadcast signal is a signal encoded through scalable video coding to have multiple layers, the broadcast signal receiver and its operation method according to embodiments of the present invention calculate signal quality values of the respective layers, select a better signal quality layer, and process the signal of the better signal quality layer. Therefore, it is possible to provide higher quality images to the user even when the broadcast signal receiver is disposed in a region where a broadcast signal reception environment is not good.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, specific embodiments of the present invention will be described in detail with reference to the accompanying drawings.

The advantages and features of the present invention and the manner of achieving them will become apparent with reference to the embodiments described in detail below and the accompanying drawings. The present invention may, however, be embodied in many different forms and should not be construed as being limited to the embodiments set forth herein. Rather, these embodiments are provided so that the present invention will be thorough and complete and will fully convey the concept of the invention to those skilled in the art. Thus, the present invention will be defined only by the scope of the appended claims. Like numbers refer to like elements throughout the following description herein.

The broadcast signal receiver 100 according to the present invention refers to a device for receiving and processing a terrestrial broadcast signal, a cable broadcast signal, and a satellite broadcast signal. In the description below, it is assumed that an image display apparatus has a broadcast signal reception function.

Figure 1:
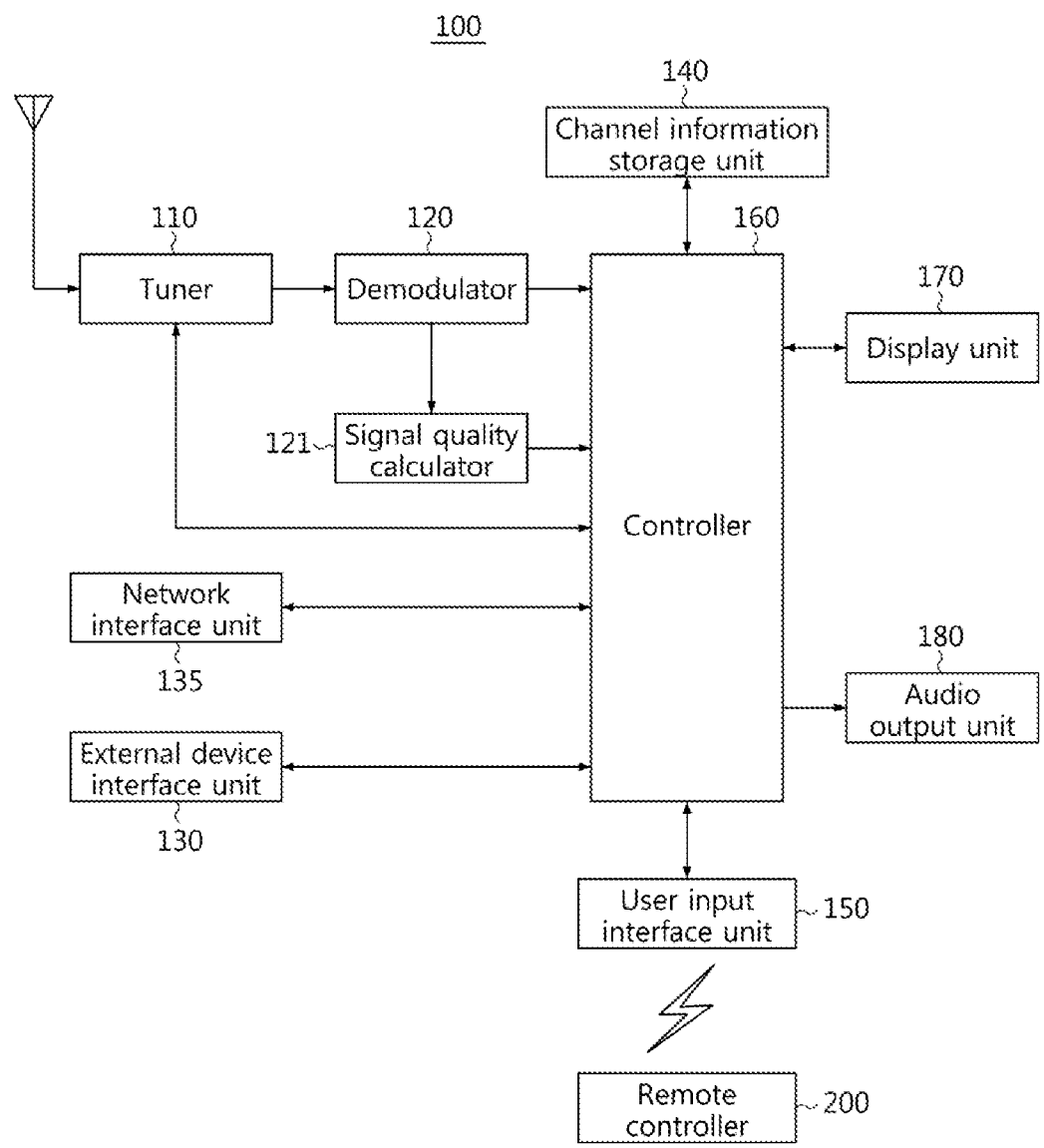
FIG. 1 is a block diagram illustrating a broadcast signal receiver according to one embodiment of the present invention.

FIG. 1 is a block diagram illustrating a broadcast signal receiver 100 according to one embodiment of the present invention. The broadcast signal receiver 100 according to one embodiment of the present invention includes a tuner 110, a demodulator 120, a signal quality calculator 121, a channel information storage unit 140, and a controller 160.

The tuner 110 tunes broadcast signals corresponding to a specific channel, selected among RF broadcast signals transmitted via an antenna under control of the controller 160, thereby generating intermediate frequency (IF) broadcast signals. The tuner 110 may for example be achieved by an RF IC that including a mixer, a phase locked loop (PPL) and an oscillator. The demodulator 120 demodulates a broadcast signal of a tuned channel and outputs a signal in the form of a transport stream (TS). The transport stream (TS) output from the demodulator 120 may be input to the controller 160.

The controller 160 de-multiplexes the transport stream into an image signal an audio signal and a data signal, processes the video signal and audio signal and output to the display unit 170 and audio output unit 180. The controller may include de-multiplexer integrated circuits, a decoder, an image processor, and an audio processer. The controller 170 de-multiplexes the broadcast signal and determines whether a de-multiplexed data signal includes channel number information and channel name information. For example, in the case of an ATSC digital broadcast signal, channel number information and channel name information may be included in Program and System Information Protocol (PSIP).

The signal quality calculator 121 measures at least one of the signal strength (called a received signal strength indicator (RSSI)), the signal-to-noise ratio (SNR), and the bit error rate (BER) of a received broadcast signal and generate signal quality data of the broadcast signal. That is, the signal quality data means at least one of the RSSI, the SNR, and the BER. The RSSI, the SNR, and the BER may be measured by corresponding signal processing modules. For example, the RSSI may be measured by the tuner, and the SNR may be calculated by the demodulator 120. In the present embodiment, for example, the signal quality calculator 121 is included in the demodulator 120, and the SNR is used as the signal quality data.

The channel information storage unit 140 is implemented in the form of a storage medium such as a memory and stores broadcast channel information such as channel map.

The controller 160 generates and sets the channel map using the PSIP in the channel information storage unit 140 through a channel scan operation. The channel information storage unit 140 stores the channel map information that is set through a channel scan operation. The channel map information includes broadcast channel ID, broadcast channel number, broadcast channel name, broadcast channel program information, tuning information of broadcasting channels and so on.

In addition, the channel information storage unit 140 may store a lookup table in which signal quality reference values of broadcast signals according to respective broadcast standards are stored. In the lookup table for the signal quality reference values of the respective broadcast signals, the signal quality reference values are data related to the threshold of visibility (TOV) value according to a modulation technique, a coding technique, and/or a constellation of each of the broadcast signals. The data means the signal quality (for example, SNR value) required to ensure minimum visibility. The signal quality reference TOV value of each broadcast signal according to a corresponding broadcast standard, contained in the lookup table, may be determined in advance through a test for broadcast signal reception performance according to a modulation technique, a coding technique, and/or a constellation of a broadcast signal.

The controller 160 controls the tuner and the demodulator 120 to tune and demodulate the broadcast signals according to a channel selection instruction, and controls overall operation of the broadcast signal receiver 100. The controller 160 may be composed of a program code for control and signal processing, a memory for storing a processed image signal, a processed audio signal, and a processed data signal, and a processor for executing the program code. The memory may store a program code for processing each of the signals and controlling the operation of the broadcast signal receiver, and may store image signals, audio signals, or data signals that are processed.

The controller 160 controls the tuner 110 to tune broadcast signals in response to a channel scan instruction, extracts the broadcast channel information from the transport stream (TS) output from the demodulator 120. The controller 160 can check the broadcast channel information such as broadcast channel number, broadcast channel name and so on, and determine whether the same broadcast channel exists. The same broadcast channels mean a channel having the same channel information, such as, a same channel number, a same channel name, and/or a same channel program. The same channels may have different channel frequencies. The controller 160 may determine whether the same broadcast channel exists using the channel information included in PSIP.

When there is a plurality of broadcast signals for the same broadcast channel, and the plurality of broadcast signals respectively complies with different broadcast standards, the controller 160 selects only one broadcast signal for a specific channel from among the plurality of broadcast signals on the basis of the signal quality data generated by the signal quality calculator 121, and sets the the specific channel in the channel map as the selected broadcast signal. The controller controls the channel information storage unit 140 to store the channel information (ex, channel number, channel name, channel tuning information and so on) of the selected broadcast signal as the channel information corresponding to the specific channel in the channel map. In addition, when the broadcast signal is a broadcast signal generated through scalable video coding, one of the multiple layers of the broadcast signal may be selected on the basis of the signal quality data of the multiple layers.

In one embodiment to be described below, it is assumed that there are two broadcast signals including a first broadcast signal which is in compliance with a first broadcast standard and a second broadcast signal which is in compliance with a second broadcast standard. For example, the first broadcast standard may be ATSC 3.0 and the second broadcast standard may be ATSC 1.0.

Referring to FIG. 1, the broadcast signal receiver 100 may further include an external device interface unit 130, a network interface unit 135, a user input interface unit 150, a display unit 170, and audio output unit.

The external device interface unit 130 may include, for example, a high definition multimedia interface (HDMI) connector, a component video connector, a composite video connector, and/or a D-sub connector which can receive the multimedia content from a PC, a set-top box, or a multimedia playback device.

The network interface unit 135 includes a communication module for connection to a wired/wireless network including an Internet network. The network interface unit 135 may include an Ethernet terminal for connection to a wired network. For wireless connection, the network interface unit 135 may use a communication scheme such as wireless LAN (WLAN), Wi-Fi, wireless broadband (Wibro), world interoperability for microwave access (WIMA), or high speed downlink packet access (HSDPA).

The display unit 170 may display an image on the screen thereof. To this end, the display unit 170 may be implemented in the form of a liquid crystal display (LCD) panel, a light emitting diode (LED) panel, an organic light emitting diode (OLED) panel, and the like.

The audio output unit 180 receives a processed audio signal, such as a stereo signal, a 3.1 channel signal, or a 5.1 channel signal, and outputs the received audio signal. The audio output unit 180 may be implemented in the form of a speaker.

The user input interface unit 150 transfers a signal input by a user to the controller 160 or transfers a signal generated by the controller 160 to a remote control device 200. The user input interface unit 150 may include a communication module such as RF (Radio Frequency) communication module or IR (Infrared) communication module for communication with the remote controller 200.

Figure 2:
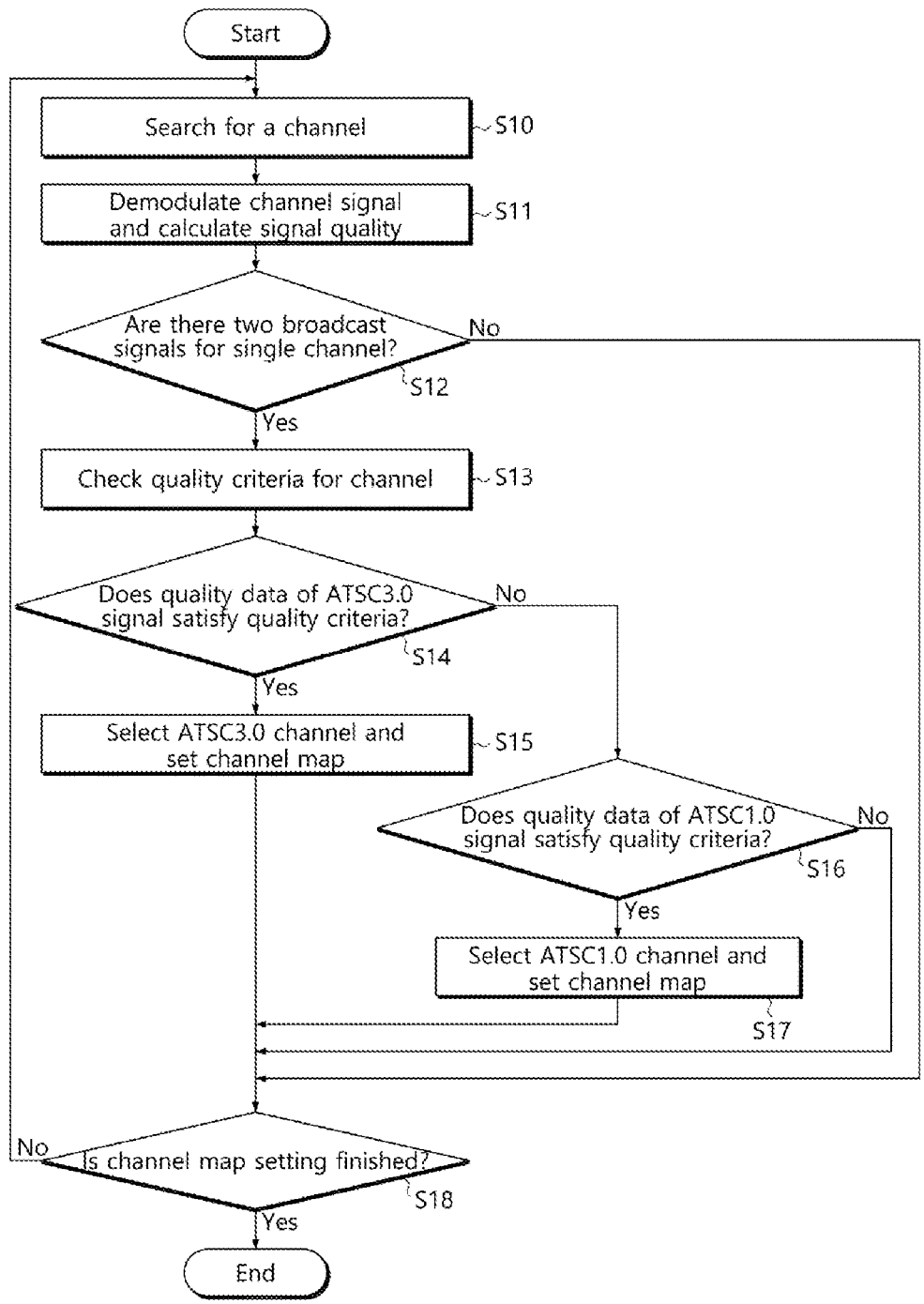
FIG. 2 is a flowchart illustrating a channel setting method for a broadcast signal receiver according to one embodiment of the present invention.

Hereinafter, a channel setting method of the broadcast signal receiver 100 of FIG. 1 will be described with reference to FIGS. 2 and 3. FIG. 2 is a flowchart illustrating the channel setting method of the broadcast signal receiver 100 according to one embodiment of the present invention.

Referring to FIG. 2, when a channel scan instruction is input from the remote control 200 through the user input interface unit 150, the controller 160 controls the broadcast signal receiver 100 to perform a channel scan operation (see FIG. 2) (S10). The tuner tunes broadcast signals in response to the channel scan instruction transmitted from the controller 160 and generates the corresponding IF signals. The demodulator 120 receives and demodulates the IF signals and calculates the SNR values of the IF signals (S11).

Next, the controller 160 determines whether or not there are both of the ATSC 3.0 signal and the ATSC 1.0 signal for a same channel on the basis of the channel information (S12). When both of the ATSC 3.0 signal and the ATSC 1.0 signal exist for a specific channel, the controller 160 checks the signal quality data of the ATSC 3.0 signal by referring to the lookup table stored in the channel information storage unit 140 (S13). The controller 160 checks a modulation scheme, a coding scheme, and a constellation of the ATSC 3.0 signal by referring to the preamble of the received ATSC 3.0 signal, and retrieves the quality reference values according to the modulation and coding schemes and the constellation from the lookup table. The controller 160 compares the calculated SNR value with the quality reference TOV value (S14). When the calculated SNR value is larger than or equal to the quality reference TOV value, the controller 160 sets the channel information of the ATSC 3.0 signal as the specific channel in the channel map (S15).

When the SNR value of the ATSC 3.0 signal is smaller than the quality reference TOV value, the controller 160 checks the quality reference value of the ATSC 1.0 signal and compares the quality reference TOV value and the calculated SNR value of the of the ATSC 1.0 signal to determine whether the received ATSC 1.0 meets the corresponding quality reference (S16). When the ATSC 1.0 signal meets the quality reference, the controller 160 sets the channel information of ATSC 1.0 channel signal as the specific channel in the channel map. (S17).

Alternatively, when the SNR value of the ATSC 3.0 signal is smaller than the quality reference TOV value of the ATSC 3.0 signal, the controller 160 may skip the comparison between the quality reference TOV value of the ATSC 1.0 signal and the calculated SNR value of the ATSC 1.0 signal and directly sets the channel information of the ATSC 1.0 channel signal as the specific channel in the channel map.

The operation of checking for whether there are two or more broadcast signals for the same broadcast channel and the channel map setting operation may be performed in real time whenever a channel is selected. Alternatively, the operations may be performed after a database of channel information of the ATSC 3.0 signal and the ATSC 1.0 signal is constructed.

Since only one channel information is stored to receive one broadcast signal of a plurality of broadcast signals for the one broadcast channel through the channel map setting (S18), the user is provided with one broadcast signal through one channel.

As described above, the present invention neither uses a method of comparing the signal qualities of a plurality of broadcast signals for the same broadcast channel with each other nor uses a method of comparing each of the signal qualities of the plurality of broadcast signals representing the same content with a predetermined reference value. According to the present invention, when any one of the broadcast signals that are respectively in compliance with different broadcast standards is better in image quality, service, etc., priority is given to the broadcast signal and the broadcast signal is set as a channel signal for a specific channel. For example, when a first broadcast signal according to a first standard is superior in image quality or additional service to a second broadcast signal according to a second standard, the controller 160 determines whether the first broadcast signal meets the quality reference thereof according to the first standard. When the quality reference is satisfied, the first broadcast signal may be set in the channel map as the broadcast signal for the corresponding channel. When the first broadcast signal does not satisfy the quality reference thereof, it is determined whether the second broadcast signal according to the second standard having the next priority satisfies the quality reference thereof. In this way, the channel setting may be performed by determining whether the quality reference of a specific broadcast signal is satisfied for multiple broadcast signals from one after another according to a predetermined priority order of the broadcast signals. This channel setting method may be diversely modified.

Figure 3:
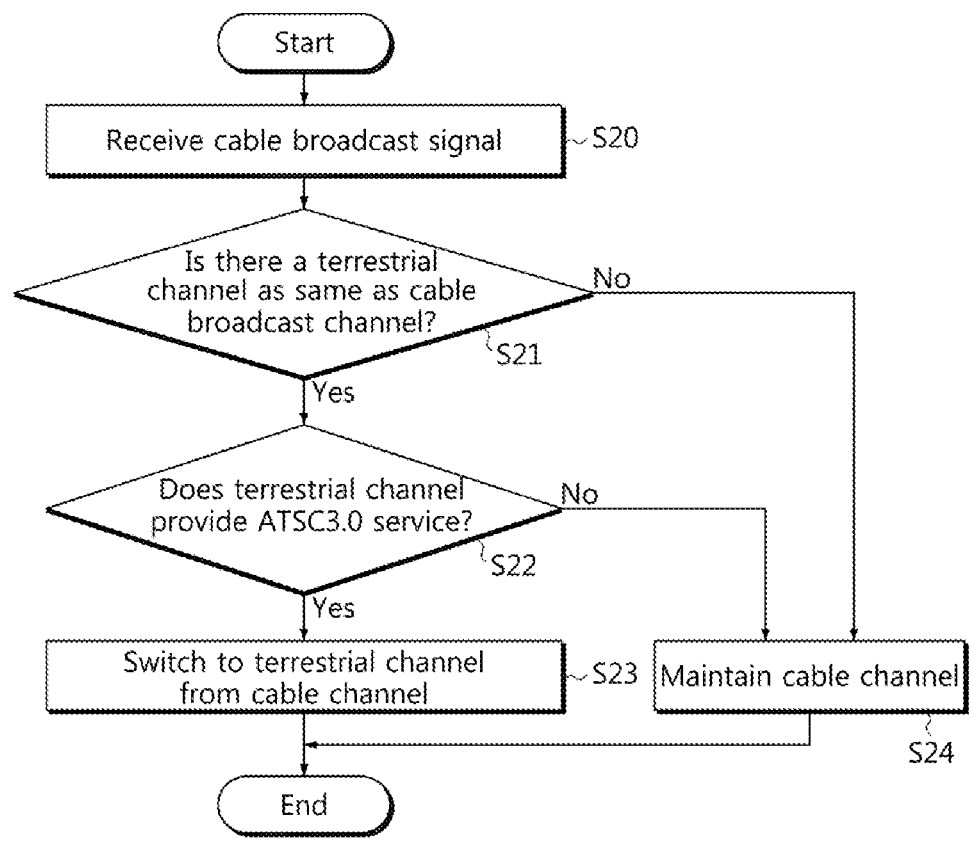
FIG. 3 is a flowchart illustrating a channel setting method for a broadcast signal receiver according to another embodiment of the present invention.

FIG. 3 is a flowchart illustrating a channel setting method of the broadcast signal receiver 100 according to another embodiment of the present invention. FIG. 2 illustrates a channel setting method for a terrestrial broadcast signal during channel scanning, and FIG. 3 illustrates a channel setting method for a case where a terrestrial broadcast signal and a cable broadcast signal are simultaneously received. When a terrestrial broadcast signal and a cable broadcast signal are simultaneously received, both of the processes of FIGS. 2 and 3 may be performed.

The channel information storage unit stores the channel maps respectively for the terrestrial broadcast signal and the cable broadcast signal. The controller sets the channel map for the terrestrial broadcast signal and a cable broadcast signal using PSIP within the broadcast signal. The controller 160 can check the broadcast channel information such as broadcast channel number, broadcast channel name and so on using PSIP, and determine whether the same broadcast channel exists.

When a channel scan instruction or a channel selecting instruction is input, the controller 160 controls the tuner to receive a cable broadcast signal through a set-top box connected via the external device interface unit 130 and perform channel tuning and signal demodulation (S20). Next, the controller 160 checks whether there is a same terrestrial broadcast channel signal as the selected cable broadcast channel (S21). When there is a channel map for terrestrial broadcast signals, the checking may be performed on the basis of the channel map. When there is the same ATSC 3.0 broadcast channel signal as the selected cable broadcast channel (S22), the controller 160 change to the ATSC 3.0 broadcast channel (S23). On the other hand, when there is no ATSC 3.0 broadcast for the selected channel, the cable broadcast channel is maintained (S24). According to cable broadcasting standards, there is a plan to transform the ATSC 3.0 signals into the ATSC 1.0 signals for transmission. That is, all cable broadcast signals are ATSC 1.0 signals. Therefore, when a specific cable broadcast signal is input through a specific channel and there is a terrestrial broadcast signal (ATSC 3.0 signal) corresponding to the same channel, the broadcast signal receiver according to the present invention automatically provides the terrestrial broadcast signal having higher quality to the user.

As described above, according to the present invention, when there is a plurality of broadcast channel signals for one specific channel, only one broadcast signal with higher quality service is set as a channel signal to be carried. That is, the channels and broadcast signals are set to be in one-on-one correspondence. Such a channel setting process is performed for each channel, and a plurality of same channel signal may not be provided to the user.

Figure 4:
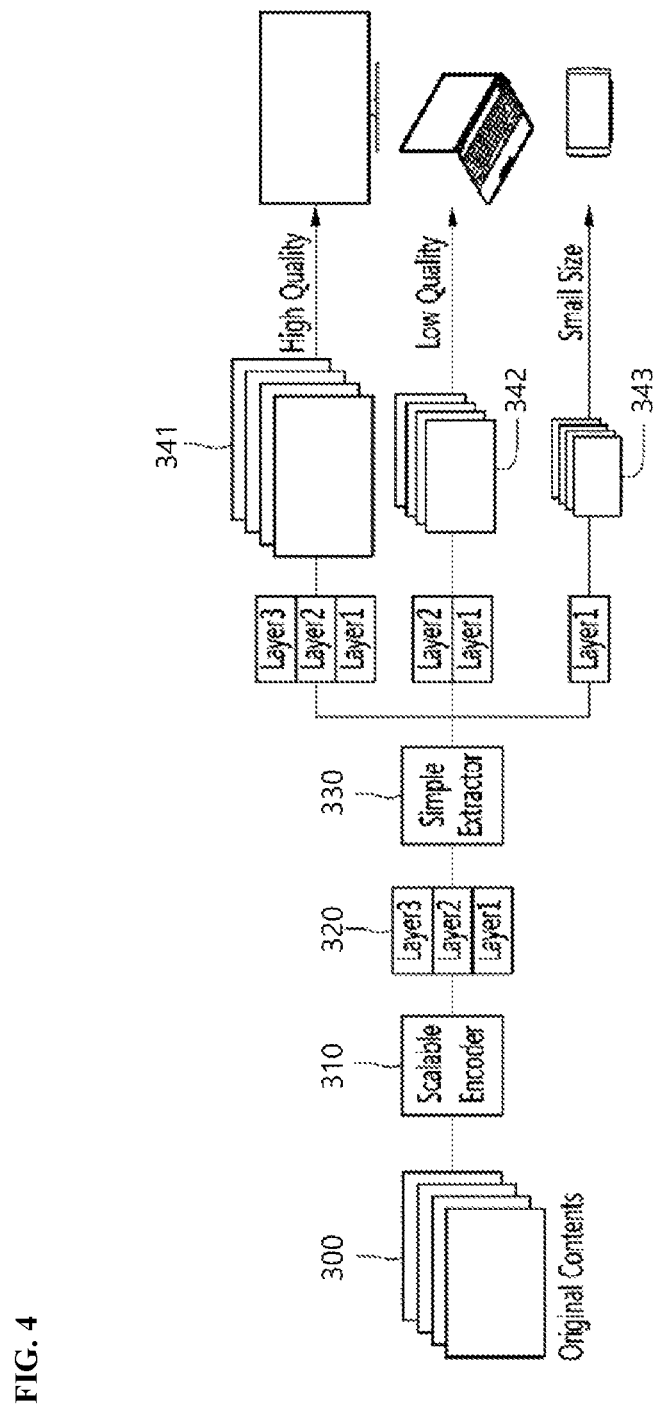
FIG. 4 is a view illustrating a scalable HEW (SHVC) service.

Hereinafter, a method of receiving and processing a scalable coded broadcast signal according to an embodiment of the present invention will be described with reference to FIGS. 4 to 6. FIG. is a view illustrating a scalable HEVC (SHVC) service. According to the scalable coding scheme, an original content 300 is hierarchically encoded to support various resolutions, frame rates, and qualities (i.e., bit rates) for one bitstream. That is, a bit stream 320 generated by a scalable encoder 310 includes a plurality of layers. The bit stream encoded in a hierarchical manner is transmitted to the broadcast signal receiver 100, and the broadcast signal receiver 100 extracts only a part of the bitstream that satisfies its specification and decodes it into a suitable image.

Specifically, an extractor 330 may check the layer identifiers included in the encoded bitstream, and extract and decode only some units of bits including a target layer identifier. For example, the encoded bitstream may be differently decoded into content 341 extracted from first to third layers, content 342 extracted from the first and second layers, or content 343 extracted from only the first layer, depending on the performance and environment of a user terminal device. The first layer is a base layer which requires a low transmission rate and has strong resistance to noise, and the second and third layers are enhancement layers which require a high transmission rate and are vulnerable to noise and signal distortion.

When the broadcast signal receiver 100 includes an advanced tuner capable of receiving an SHVC broadcast signal, the receiver can receive and process the content 341 extracted from all the layers (first to third layers) included in the SHVC signal. In this case, when the signal quality is not good, noise and distortion may appear on the screen.

In the broadcast signal receiver 100 having the SHVC function according to the present invention, signal quality data of each of the layers in an SHVC signal is calculated, and the layers of the SHVC signal are selectively used extracted and decoded.

Figure 5:
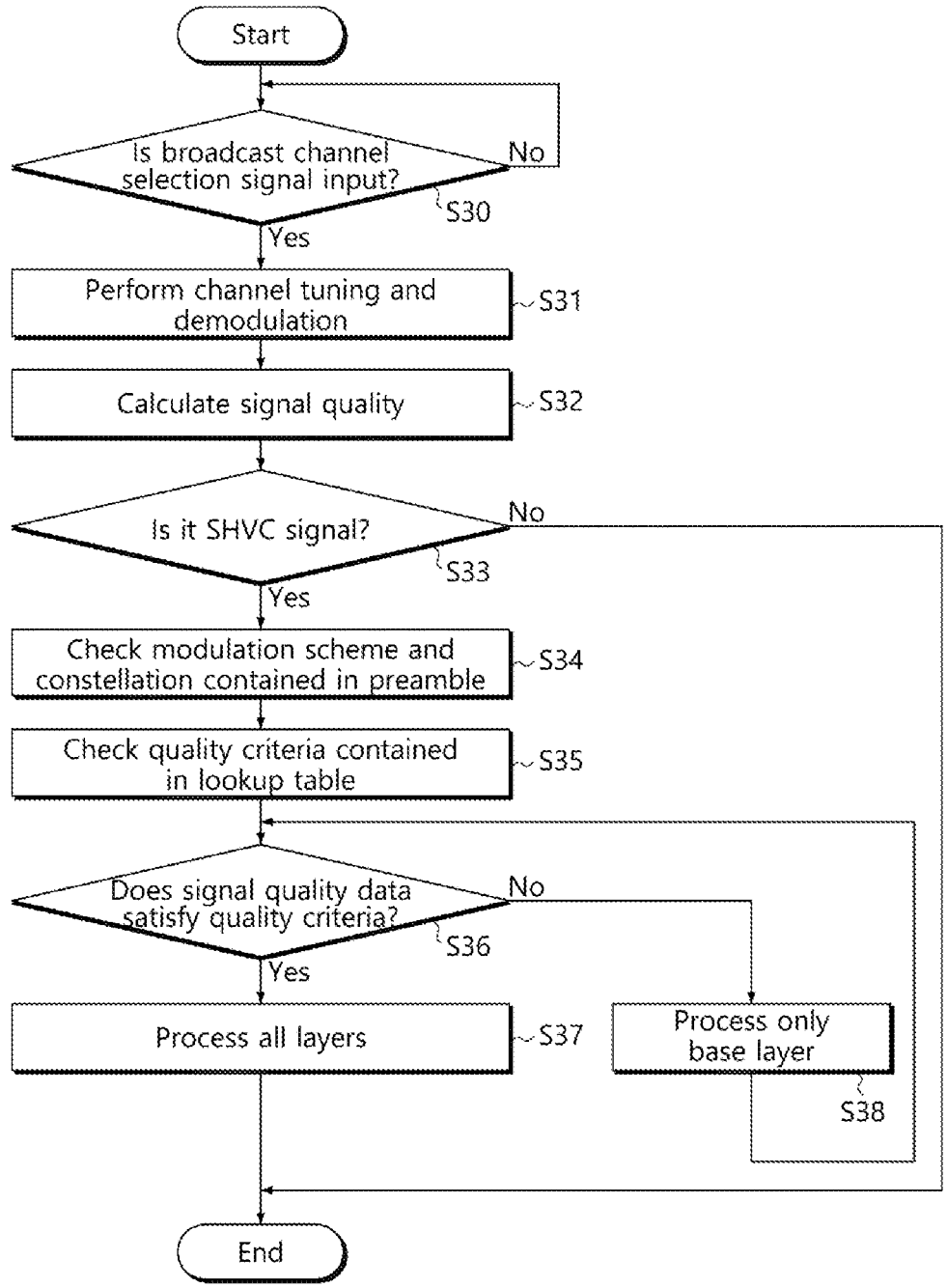
FIG. 5 is a flowchart illustrating a method of receiving and processing an SHVC broadcast signal according to an embodiment of the present invention.

FIG. 5 is a flowchart illustrating a method of receiving and processing an SHVC broadcast signal according to an embodiment of the present invention. Referring to FIG. 5, when a selection signal for a specific broadcast channel is input (S30), the controller 160 controls the tuner and the demodulator to tune and demodulate a broadcast signal corresponding to the specific broadcast channel (S31). Meanwhile, the signal quality calculator 121 calculates a signal quality value (for example, SNR value) of the received broadcast signal (S32).

When the received signal is an SHVC signal (S33), the controller 160 checks the modulation and coding schemes and the constellation of the SHVC signal with reference to the preamble of the received broadcast signal (S34), and retrieves the quality reference value of the received broadcast signal from the channel information storage unit 140. That is, the controller 160 retrieves the quality reference TOV value corresponding to the modulation and coding schemes and the constellation of the received broadcast signal from a lookup table containing data of the quality reference values of broadcast signals (S35). When the calculated signal quality data of the broadcast signal satisfies the quality reference TOV value retrieved from the lookup table (S36), the controller 160 receives and processes signals extracted from all the layers included in the received SHVC signal (S37).

When the calculated signal quality data of the broadcast signal does not satisfy the quality reference TOV value retrieved from the lookup table (S36), the controller 160 receives and processes only a signal extracted from the base layer among the layers included in the received SHVC signal (S38). According to another embodiment, the signals extracted from only the first layer and the second layer except for the third layer may be received and processed.

Figure 6:
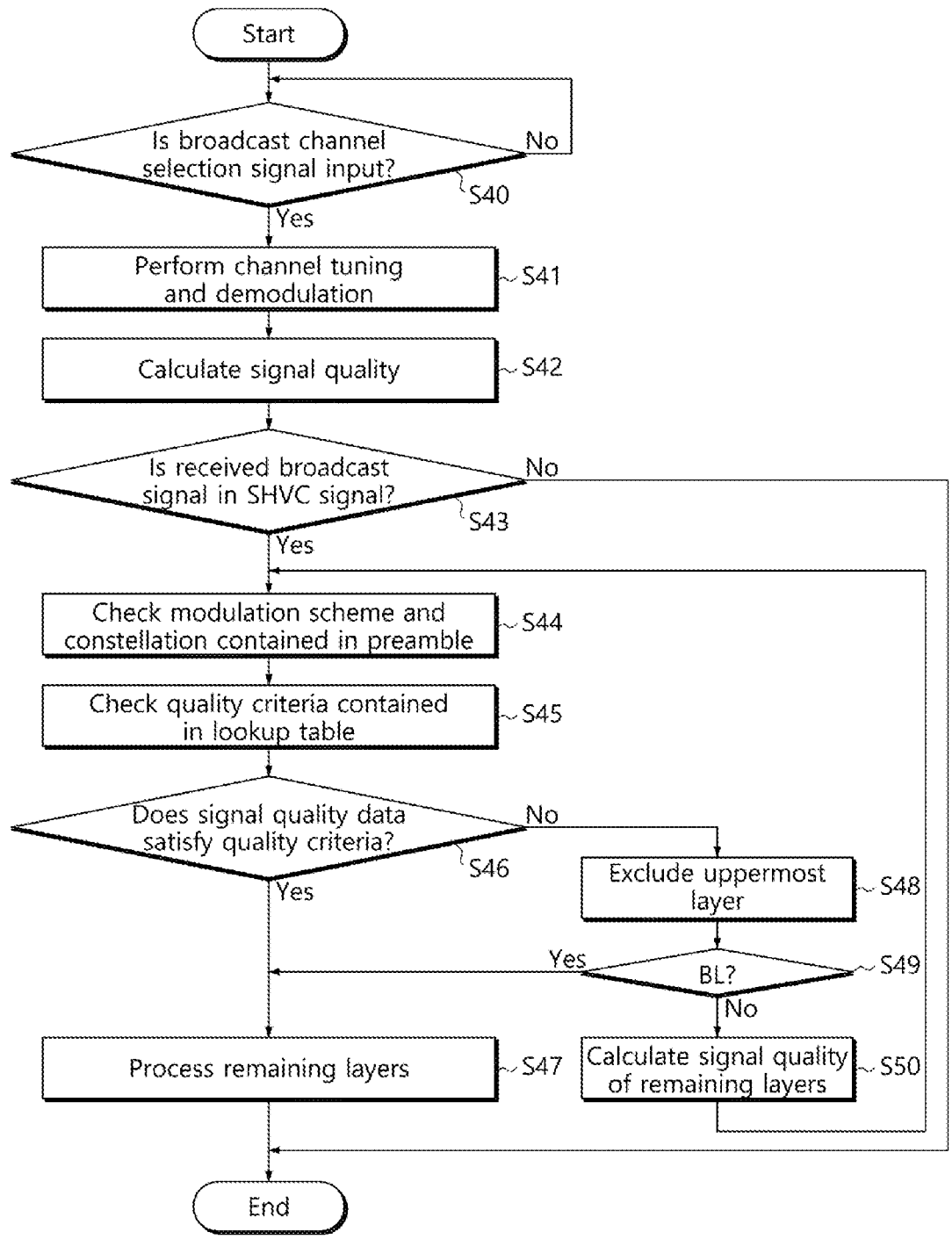
FIG. 6 is a flowchart illustrating a method of receiving and processing an SHVC broadcast signal according to another embodiment of the present invention.

FIG. 6 is a flowchart illustrating a method of receiving and processing an SHVC broadcast signal according to another embodiment of the present invention. Referring to FIG. 6, when a selection signal for a broadcast channel is input (S40), the controller 160 controls to the tuner and the demodulator to tune and demodulate the corresponding channel (S41). Meanwhile, the signal quality calculator 121 calculates a signal quality value (for example, SNR value) of the received broadcast signal (S42).

When the received signal is an SHVC signal (S43), the controller 160 checks the modulation and coding schemes and the constellation contained in the preamble of the received broadcast signal (S44), and retrieves the quality reference TOV value corresponding to the modulation and coding schemes and the constellation from the lookup table containing the quality reference values of broadcast signals (S45). When the calculated signal quality data of the broadcast signal satisfies the quality reference TOV value retrieved from the lookup table (S46), the controller 160 receives and processes signals extracted from all the layers included in the received SHVC signal (S47).

When the signal quality data of the calculated broadcast signal does not satisfy the quality reference TOV value retrieved from the lookup table (S46), the controller 160 excludes the highest enhancement layer from the layers included in the received SHVC signal (S48). When only the base layer remains (S49), only the signal corresponding to the base layer is processed (S47). When another layer is included in addition to the base layer, the signal quality value of each of the remaining layers is calculated (S50). Here, the signal quality value of each of the layers may be calculated in the broadcast signal reception and demodulation step (S42). When calculating the signal quality value, the signal quality value of only the uppermost layer may be calculated and compared with the quality reference value, or the signal quality value of every layer may be calculated and compared with the quality reference value.

The controller 160 checks modulation coding schemes and the constellation of each of the remaining layers (for example, the first layer and the second layer) (S44), and retrieves the corresponding quality reference values from the lookup table (S45). When the calculated signal quality data satisfies the quality reference value retrieved from the lookup table (S46), the controller 160 receives and processes signals extracted from the first layer and the second layer (S47).

When the calculated signal quality data does not satisfy the quality reference value retrieved from the lookup table (S46), the controller 160 receives and processes only a signal extracted from only the base layer (S47).

As described above, according to the present invention, although the broadcast signal receiver 100 has an SHVC signal processing function, the broadcast signal receiver 100 does not automatically receive and process signal extracted from all of the layers but adaptively receives signals extracted from only the necessary layers according to the signal quality of the received broadcast signal. Therefore, the broadcast signal receiver 100 according to the present invention can provide a high quality broadcast signal to the user even in a poor broadcast reception environment.

In the embodiment described above, it is assumed that the signal quality value is determined on the basis of only the SNR. However, if necessary, various signal quality values such as channel variability as well as the SNR may be considered for section of the broadcast signals and/or the layers.

In addition, in the embodiment described above, it is assumed that two broadcast signals (i.e., an ATSC 1.0 signal and an ATSC 3.0 signal) are transmitted to the broadcast signal receiver. However, the present invention may not be limited to that case but may also be applied to the case where more than two broadcast signals according to respectively different broadcast standards are transmitted.

On the other hand, the operation method of the broadcast signal receiver 100 according to the present invention may be implemented in the form of a processor-readable code recorded on a processor-readable recording medium provided in the broadcast signal receiver. The processor-readable recording media include all kinds of recording devices that store data that can be read by the processor. Specific examples of the processor-readable recording medium include a ROM, a RAM, a CD-ROM, a magnetic tape, a floppy disk, an optical data storage device, and the like. The processor-readable recording medium may be implemented in the form of a carrier wave for transmission of a signal over the Internet. The processor-readable recording medium is configured such that code that can be read and executed by a processor is stored in a distributed manner in computer systems connected over a network.

Although the preferred embodiments of the present invention have been described for illustrative purposes, those skilled in the art will appreciate that various modifications, additions, and substitutions are possible, without departing from the scope and spirit of the present invention as defined in the appended claims. It is thus well known to those skilled in the art that the present invention is not limited to the embodiments disclosed in the detailed description but rather cover various modifications, additions, substitutions, and equivalents to the embodiments.

What is claimed is:

1. A broadcast signal receiver comprising:
    a tuner configured to tune to broadcast signals received via an antenna;
    a demodulator configured to demodulate the broadcast signals;
    a channel information storage unit configured to store a channel map; and
    a signal quality calculator configured to calculate a signal quality value of the broadcast signals; and
    a controller configured to control the tuner to tune to a broadcast signal in response to a channel searching instruction, wherein when the controller determines that there is a plurality of broadcast channels corresponding to a specific channel, and the plurality of broadcast channel signals complies with different broadcast standards, the controller selects one of the plurality of broadcast channels on the basis of the calculated signal quality values of the respective broadcast signals and sets channel information of the selected broadcast channel as the specific channel in the channel map.

2. The broadcast signal receiver according to claim 1, wherein the plurality of broadcast channels include a first broadcast signal that complies with a first broadcast standard,
    wherein the channel information storage unit stores a lookup table including signal quality reference values for the respective broadcast signals,
    wherein the controller checks a modulation and a constellation for the first broadcast signal with reference to a preamble of the first broadcast signal, retrieves the signal quality reference value of the respective broadcast signal from the lookup table, compares the signal quality reference value retrieved from the lookup table and the signal quality value calculated by the signal quality calculator, selects the first broadcast signal for the specific channel when the signal quality value of the first broadcast signal satisfies the quality reference value, and sets channel information of the first broadcast signal as the specific channel in the channel map.

3. The broadcast signal receiver according to claim 2, wherein the plurality of broadcast channels include a second broadcast signal which complies with a second broadcast standard, and
    wherein when the signal quality value of the first broadcast signal does not satisfy the quality reference value retrieved from the lookup table, the controller checks whether the signal quality value of the second broadcast signal satisfies the quality reference value of the second broadcast signal, selects the second broadcast signal for the specific channel when it is determined that the quality reference value of the second broadcast signal is satisfied, and sets channel information of the second broadcast signal as the specific channel in the channel map.

4. The broadcast signal receiver according to claim 3, wherein the first standard is an ATSC 3.0 standard and the second standard is an ATSC 1.0 standard,
    wherein the broadcast signal receiver further comprises an external device interface unit that connects the broadcast signal receiver to an external device, and
    wherein when a specific cable channel is selected by a user and a cable broadcast signal for the specific cable channel is input through the external device interface unit, the controller checks whether there is a terrestrial broadcast channel as same as the specific cable channel, changes the channel to the terrestrial broadcast channel from the specific cable channel when the terrestrial broadcast channel is the first broadcast signal that complies with the ATSC 3.0 standard, and maintains the specific cable channel when the terrestrial broadcast channel is the second broadcast signal that complies with the ATSC 3.0 standard or when there is no terrestrial channel as same as the specific cable channel.

5. The broadcast signal receiver according to claim 1, further comprising: a user input interface unit configured to receive a user input,
    wherein the multiple broadcast signals include a first broadcast signal that complies with a first broadcast standard,
    wherein the first broadcast signal includes multiple hierarchical layers,
    wherein when a channel selection instruction is input through the user input interface unit, the controller controls the tuner to tune a specific channel corresponding to the channel selection instruction on the basis of the channel map, and
    wherein when a broadcast signal for the specific channel is the first broadcast signal, the controller receives the signal quality value of the first broadcast signal from the signal quality calculator and process at least one layer of the multiple layers of the first broadcast signal on the basis of the signal quality value.

6. The broadcast signal receiver according to claim 5, wherein the first broadcast signal is an SHVC broadcast signal,
    wherein the channel information storage unit stores a lookup table containing quality reference values of respective broadcast signals, and
    wherein the controller checks a modulation and a constellation contained in a preamble of the received SHVC broadcast signal, compares a quality reference value according to the modulation and the constellation of the received SHVC broadcast signal and a signal quality value of the SHVC broadcast signal, and processes only a signal of a base layer contained in the SHVC broadcast signal when the signal quality value of the SHVC broadcast signal does not satisfy the quality reference value of the SHVC broadcast signal.

7. The broadcast signal receiver according to claim 5, wherein the first broadcast signal is an SHVC broadcast signal,
    wherein the channel information storage unit stores a lookup table containing quality reference values of broadcast signals,
    wherein the controller checks a modulation scheme and a constellation contained in a preamble of the received SHVC broadcast signal, compares a quality reference value retrieved from the lookup table on the basis of the modulation scheme and the constellation of the received SHVC broadcast signal and a signal quality value of the SHVC broadcast signal, and processes only a part of layers contained in the SHVC broadcast signal except for the uppermost layer when the signal quality value does not satisfy the quality reference value.

8. The broadcast signal receiver according to claim 5, wherein the first broadcast signal is an SHVC broadcast signal,
    wherein the SHVC broadcast signal contains one base layer and multiple enhancement layers,
    wherein the demodulator calculates signal quality values of the respective layers of the SHVC broadcast signal, wherein the channel information storage unit stores a lookup table containing quality reference values of respective broadcast signals, and wherein the controller checks a modulation scheme and a constellation contained in a preamble of the received SHVC broadcast signal, compares a quality reference value retrieved from the lookup table on the basis of the modulation scheme and the constellation of the received SHVC broadcast signal and the signal quality value of each of the layers of the SHVC broadcast signal one after another from the uppermost layer, and processes only the layers whose signal quality values satisfy the quality reference value.

9. The broadcast signal receiver according to claim 1, wherein the signal quality value is at least one value selected from among a signal-to-noise ratio (SNR) value, a signal strength value, and a channel variability value.

10. An operation method of a broadcast signal receiver, the method comprising:

searching for a specific channel;

demodulating multiple broadcast signals that respectively comply with different broadcast standards;

calculating a signal quality value of each of the multiple broadcast signals;

comparing, when there is a plurality of channels for the specific channel, a quality reference value of each of broadcast signals of the plurality of same channels with the calculated signal quality value of a corresponding one of the plurality of channels; and selecting, when the signal quality value of a first broadcast signal that complies with a first broadcast standard satisfies the quality reference value of the first broadcast signal, the first broadcast signal as the specific channel, and storing a channel information of the first signal in a channel map.

11. The method according to claim 10, wherein the comparing comprises a step of checking a modulation and a constellation of a received broadcast signal with reference to a preamble of the received broadcast signal, retrieving a quality reference value of the received broadcast signal on the basis of the modulation scheme and the constellation, and comparing the retrieved quality reference value and the signal quality value of the received broadcast signal.

12. The method according to claim 11, wherein the first broadcast standard is an ATSC 3.0 standard and the plurality of channels includes a second broadcast signal that complies with a second broadcast standard which is an ATSC 1.0 standard, and wherein when the signal quality value of the first broadcast signal does not satisfy the quality reference value of the first broadcast signal, the method further comprises: checking whether the signal quality value of the second broadcast signal satisfies the quality reference value of the second broadcast signal; selecting the second broadcast signal corresponding to the the specific channel when it is determined that the quality reference value of the second broadcast signal is satisfied; and sets the channel information of the second broadcast signal as the specific channel in the channel map.

13. The method according to claim 12, further comprising:

receiving a cable broadcast signal corresponding to a specific cable channel from a set-top box;

checking whether there is a terrestrial channel as same as the received cable broadcast signal with reference to the channel map;

switching to the terrestrial channel when it is determined that the terrestrial channel corresponds to a first broadcast signal that complies with the ATSC 3.0 standard; and maintaining the specific cable channel when the terrestrial channel corresponds to a second broadcast signal that complies with the ATSC 1.0 standard or when there is no terrestrial channel as same as the cable broadcast signal.

14. The method according to claim 10, wherein the first broadcast signal is an SHVC broadcast signal, and wherein the method further comprises: tuning and demodulating a channel in response to a channel selection instruction on the basis of the channel map when the channel selection instruction is input; and checking a signal quality value of the received SHVC broadcast signal when the broadcast signal on the channel is the SHVC broadcast signal; and performing signal processing on at least one of multiple layers included in the SHVC broadcast signal on the basis of the signal quality values of the respective layers, thereby outputting a processed broadcast signal.

15. The method according to claim 14, wherein the performing of the signal processing comprises:

checking a modulation scheme and a constellation contained in a preamble of the received SHVC broadcast signal; comparing a quality reference value of the SHVC broadcast signal with a calculated signal quality value of the SHVC broadcast signal; and processing and outputting a signal corresponding to only a base layer among the multiple layers of the SHVC broadcast signal when the calculated signal quality value does not satisfy the quality reference value.

16. The method according to claim 14, wherein the performing of the signal processing comprises:

checking a modulation and a constellation contained in a preamble of the received SHVC broadcast signal; comparing a quality reference value of the SHVC broadcast signal and a calculated signal quality value of the SHVC broadcast signal; and processing and outputting only a portion of the multiple layers of the SHVC broadcast signal except for the uppermost layer when the calculated signal quality value does not satisfy the quality reference value.

17. The method according to claim 14, wherein the SHVC broadcast signal contains one base layer and multiple enhancement layers, wherein the performing of the signal processing comprises:

checking a modulation and a constellation contained in a preamble of the received SHVC broadcast signal in the demodulated channel data; comparing a quality reference value of the SHVC broadcast signal and a calculated signal quality value of the SHVC broadcast signal;

comparing the quality reference value of the SHVC broadcast signal with the signal quality value of each of the layers included in the SHVC broadcast signal, one layer after another layer, starting from the uppermost layer and eliminating the layers having the signal quality value that does not satisfy the quality reference value one after another, until a layer having a signal quality value that satisfies the quality reference value appears; and processing at least one layer remaining in the SHVC broadcast signal after the eliminating.

18. The method according to claim 10, wherein the signal quality value includes at least one value selected from among a signal-to-noise ratio (SNR) value, a signal intensity value, and a channel variability value.

19. The method according to claim 11, wherein the signal quality value includes at least one value selected from among a signal-to-noise ratio (SNR) value, a signal intensity value, and a channel variability value.

20. The method according to claim 12, wherein the signal quality value includes at least one value selected from among a signal-to-noise ratio (SNR) value, a signal intensity value, and a channel variability value.

* * * * *